(12) United States Patent
Yu et al.

(10) Patent No.: US 11,159,051 B2
(45) Date of Patent: Oct. 26, 2021

(54) RESONANT CONTACTLESS POWER SUPPLY EQUIPMENT, ELECTRICAL TRANSMITTER AND CONTACTLESS POWER SUPPLY METHOD

(71) Applicant: Silergy Semiconductor Technology (Hangzhou) LTD, Hangzhou (CN)

(72) Inventors: Feng Yu, Hangzhou (CN); Wang Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 447 days.

(21) Appl. No.: 15/966,204

(22) Filed: Apr. 30, 2018

(65) Prior Publication Data

US 2018/0254668 A1 Sep. 6, 2018

Related U.S. Application Data

(63) Continuation of application No. 14/737,719, filed on Jun. 12, 2015, now Pat. No. 9,979,234.

(30) Foreign Application Priority Data

Jun. 16, 2014 (CN) .......................... 20141026872.4

(51) Int. Cl.
*H02J 50/12* (2016.01)
*H02M 3/335* (2006.01)
(52) U.S. Cl.
CPC ......... *H02J 50/12* (2016.02); *H02M 3/33507* (2013.01); *Y02B 70/10* (2013.01)

(58) Field of Classification Search
CPC ............ H02J 50/12; H02J 17/00; H02J 7/025; H02M 3/33507; Y02B 70/10
See application file for complete search history.

(56) References Cited

U.S. PATENT DOCUMENTS

| 7,119,311 | B2 | 10/2006 | Makoto | |
|---|---|---|---|---|
| 8,299,752 | B2 | 10/2012 | Sekita et al. | |
| 8,760,114 | B2 | 6/2014 | Sekita et al. | |
| 2012/0169132 | A1* | 7/2012 | Choudhary | ........... H03J 1/0091 |
| | | | | 307/104 |
| 2012/0277829 | A1 | 11/2012 | Chow et al. | |
| 2014/0080409 | A1 | 3/2014 | Frankland et al. | |
| 2014/0175868 | A1 | 6/2014 | Sakakibara et al. | |
| 2015/0061579 | A1 | 3/2015 | Katsunaga et al. | |
| 2015/0236520 | A1* | 8/2015 | Baarman | ................ H02J 5/005 |
| | | | | 307/104 |

FOREIGN PATENT DOCUMENTS

CN 103855764 A 6/2014

\* cited by examiner

*Primary Examiner* — Carlos Amaya

(57) ABSTRACT

A resonant contactless electric energy transmitter configured to contactlessly supply electric energy to an electric energy receiver, can include: (i) a high frequency power supply configured to generate a high frequency AC power with a frequency that is the same as a leakage inductance resonant frequency, where the leakage resonant frequency is obtained by detection of an output current of the high frequency power supply that corresponds to the high frequency AC power of a sequence of different frequencies during a frequency sweeping time period; and (ii) a transmitting resonant circuit comprising a transmitting coil, and being configured to receive the high frequency AC power from the high frequency power supply.

20 Claims, 6 Drawing Sheets

RESONANT CONTACTLESS POWER SUPPLY EQUIPMENT, ELECTRICAL TRANSMITTER AND CONTACTLESS POWER SUPPLY METHOD

RELATED APPLICATIONS

This application is a continuation of the following application, U.S. patent application Ser. No. 14/737,719, filed on Jun. 12, 2015, and which is hereby incorporated by reference as if it is set forth in full in this specification, and which also claims the benefit of Chinese Patent Application No. 201410268724.4, filed on Jun. 16, 2014, which is incorporated herein by reference in its entirety.

FIELD OF THE INVENTION

The present disclosure generally relates to the field of power electronics, and more particularly to resonant contactless power supply equipment, transmitters, and associated contactless power supply methods.

BACKGROUND

Contactless power supply technology is widely applicable to a variety of electronic products, such as relatively low power electronic products (e.g., mobile phones, MP3 players, digital cameras, laptops, etc.). Typically, contactless power supply equipment includes a transformer with a transmitting coil (L1) and a receiving coil (L2). Energy can be transmitted from an electric energy transmitter to an electric energy receiver in accordance with magnetic coupling characteristics of the transmitting and receiving coils of the transformer. Such wireless electric energy transmission systems can be operated at a self-inductance resonant frequency. At this resonant frequency, the resistance of the self-inductance and capacitance of the transmitting and receiving coils can be offset. However, when operated at the self-inductance resonant frequency, a less stable current may be generated at the receiving side. This less stable current cannot be supplied to a load, and communication requirements of both the transmitting and receiving sides can be increased for some applications.

SUMMARY

In one embodiment, an apparatus can include: (i) a high frequency power supply configured to generate a high frequency AC power with a frequency that is consistent with a leakage inductance resonant frequency, where the leakage inductance resonant frequency is obtained by detection of an output current of the high frequency power supply that corresponds to the high frequency AC power of a sequence of different frequencies during a frequency sweeping time period; (ii) a transmitting resonant circuit comprising a transmitting coil, and being configured to receive the high frequency AC power from the high frequency power supply; (iii) a receiving resonant circuit comprising a receiving coil that is contactlessly coupled to the transmitting coil, and being configured to receive electric energy from the transmitting resonant circuit; and (iv) a regulation circuit coupled in parallel with output terminals of the apparatus, and being configured to guarantee that an impedance of the output terminals is less than a predetermined impedance during the frequency sweeping time period, where the output current is highest when a frequency of the high frequency AC power the same as the leakage inductance resonant frequency.

In one embodiment, a contactless power supply method for contactlessly transferring electric energy from a transmitting coil to a receiving coil coupled to the transmitting coil, can include: (i) in a frequency sweeping time period, maintaining an impedance of output terminals to be less than a predetermined impedance in order to guarantee that an output current of a high frequency AC power reaches a maximum value when the high frequency AC power with a leakage inductance resonant frequency is provided to the transmitting coil; (ii) in the frequency sweeping time period, providing the high frequency AC power of a plurality of frequencies to the transmitting coil in sequence, and detecting an amplitude of the output current corresponding to each of the plurality of frequencies, where a frequency at which the amplitude of the output current reaches a maximum value is configured as the leakage inductance resonant frequency; and (iii) transferring the high frequency AC power of the leakage inductance resonant frequency to the transmitting coil after the frequency sweeping time period ends.

In one embodiment, a resonant contactless electric energy transmitter configured to contactlessly supply electric energy to an electric energy receiver, can include: (i) a high frequency power supply configured to generate a high frequency AC power with a frequency that is the same as a leakage inductance resonant frequency, where the leakage inductance resonant frequency is obtained by detection of an output current of the high frequency power supply that corresponds to the high frequency AC power of a sequence of different frequencies during a frequency sweeping time period; and (ii) a transmitting resonant circuit comprising a transmitting coil, and being configured to receive the high frequency AC power from the high frequency power supply.

DETAILED DESCRIPTION

Figure 1:
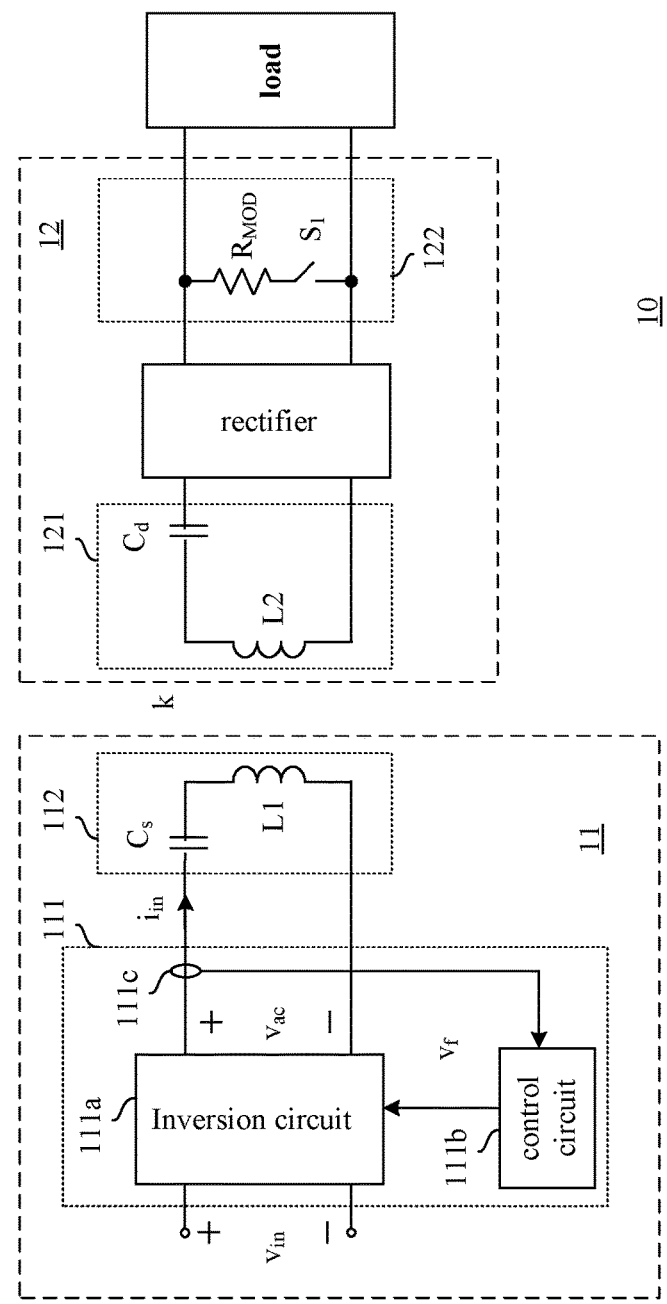
FIG. 1 is a schematic block diagram of an example resonant contactless power supply equipment, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one embodiment, an apparatus can include: (i) a high frequency power supply configured to generate a high frequency AC power with a frequency that is consistent with a leakage inductance resonant frequency, where the leakage inductance resonant frequency is obtained by detection of an output current of the high frequency power supply that corresponds to the high frequency AC power of a sequence of different frequencies during a frequency sweeping time period; (ii) a transmitting resonant circuit comprising a transmitting coil, and being configured to receive the high frequency AC power from the high frequency power supply; (iii) a receiving resonant circuit comprising a receiving coil that is contactlessly coupled to the transmitting coil, and being configured to receive electric energy from the transmitting resonant circuit; and (iv) a regulation circuit coupled in parallel with output terminals of the apparatus, and being configured to guarantee that an impedance of the output terminals is less than a predetermined impedance during the frequency sweeping time period, where the output current is highest when a frequency of the high frequency AC power the same as the leakage inductance resonant frequency.

In one embodiment, a resonant contactless electric energy transmitter configured to contactlessly supply electric energy to an electric energy receiver, can include: (i) a high frequency power supply configured to generate a high frequency AC power with a frequency that is the same as a leakage inductance resonant frequency, where the leakage inductance resonant frequency is obtained by detection of an output current of the high frequency power supply that corresponds to the high frequency AC power of a sequence of different frequencies during a frequency sweeping time period; and (ii) a transmitting resonant circuit comprising a transmitting coil, and being configured to receive the high frequency AC power from the high frequency power supply.

Referring now to FIG. 1, shown is a schematic block diagram of an example resonant contactless power supply equipment, in accordance with embodiments of the present invention. In this particular example apparatus 10, electric energy transmitter 11 can include high frequency power supply 111 and transmitting resonant circuit 112. High frequency power supply 111 can be employed to generate a high frequency alternating current (AC) power. Transmitting resonant circuit 112 can include transmitting coil L1 that receives the high frequency AC power, and transmits electric energy to electric energy receiver 12 via transmitting coil L1. For example, a leakage inductance resonant frequency can be obtained by detecting an output current of high frequency power supply 111 that varies along with the frequency of the high frequency AC power in a frequency sweeping time period.

For example, the leakage inductance resonant frequency as used herein can mean a resonant frequency at which the impedance of the leakage inductance and the resonant capacitance of the transmitting resonant circuit and the impedance of the leakage inductance and the resonant capacitance of the receiving resonant circuit can be offset in view of the self-inductance of the transmitting coil and the receiving coil being decoupled as a leakage inductance and a mutual inductance. Thus, when the system is operated at the leakage inductance resonant frequency, the efficiency can be higher than in other approaches.

Electric energy receiver 12 can include receiving resonant circuit 121 that may be contactlessly coupled to electric energy transmitter 11 in order to receive electric energy. For example, "contactlessly" as used herein can mean no direct physical or mechanical connection therebetween, such as in a wireless type of connection. Receiving resonant circuit 121 can include receiving coil L2 contactlessly coupled to transmitting coil L1, and configured to receive electric energy from transmitting coil L1. A rectifier circuit can also be included in electric energy receiver 12 in order to rectify the signal output from receiving resonant circuit 121.

In this particular example, high frequency power supply 111 can include inversion circuit 111a, control circuit 111b, and current detection circuit 111c. Inversion circuit 111a can generate a relatively high frequency AC power (e.g., $V_{ac}$) in accordance with frequency control signal $V_f$ generated by control circuit 111b. The frequency of high frequency AC power $V_{ac}$ may thus correspond to frequency control signal $V_f$.

Inversion circuit 111a can be controlled by control circuit 111b in order to generate high frequency AC power $V_{ac}$ with a plurality of frequencies in sequence in frequency sweeping time period $T_s$. In addition, the amplitude of output current $i_{in}$, corresponding to each of the plurality of frequencies can be detected. Thus, the frequency at which the amplitude of output current $i_{in}$, is highest may be configured as leakage inductance resonant frequency $\omega_1$. Frequency control signal $V_f$ corresponding to leakage inductance resonant frequency $\omega_1$ may be output after the end (e.g., the time duration has elapsed) of frequency sweeping time period $T_s$. Current detection circuit 111c can detect the amplitude of output current $i_{in}$, generated by inversion circuit 111a.

Transmitting resonant circuit 112 can include transmitting coil L1 that receives the high frequency AC power from high frequency power supply 111. In order to balance the leakage inductive reactance of transmitting resonant circuit 112, reflection inductive reactance of receiving resonant circuit 121, and the inductive reactance generated by the parasitic parameters of the circuit in order to eliminate the peak voltage and surge current generated by these parasitic parameters, as well as to decrease the electromagnetic interference, power noise and apparent power, in order to increase the power factor, transmitting resonant capacitor $C_s$ can be employed. In transmitting resonant circuit 112, transmitting resonant capacitor $C_s$ can connect in series or in parallel with transmitting coil L1 in order to form a resonant circuit together with transmitting coil L1. For example, the distributive capacitance of the circuit, or the distributive capacitance between wires of transmitting coil L1, can also be employed as the transmitting resonant capacitor. In this case, no independent capacitor may be utilized in transmitting resonant circuit 112.

Electric energy receiver 12 can include receiving resonant circuit 121, which can include receiving coil L2 contactlessly coupled to transmitting coil L1. The coupling degree of transmitting and receiving coils L1 and L2 can be "k," whereby receiving coil L2 is configured to receive electric energy from transmitting coil L1. Receiving resonant capacitor $C_d$ can be employed in receiving resonant circuit 121 in order to decrease the reactive power of the electric energy receiver 12, and to increase the active power transmitted through the magnetic coupling configuration. As described above, a distributive capacitor of the components of the circuit can be employed as receiving resonant capacitor $C_d$, and in such a case no independent capacitor may be arranged in the circuit.

Electric energy receiver 12 can also include regulation circuit 122 coupled in parallel with the output terminals of the power supply equipment. Regulation circuit 122 can control the impedance of the output terminals of the power supply to be less than a predetermined impedance during the frequency sweeping time period, in order to guarantee that the output current is highest when the high frequency AC power with the leakage inductance resonant frequency is generated by high frequency power supply 111.

Figure 2:
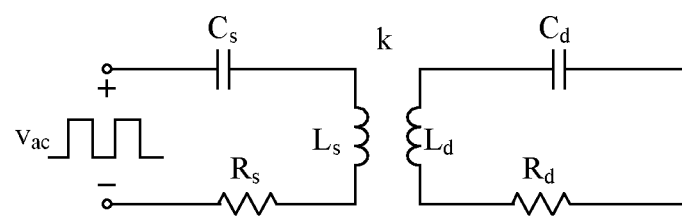
FIG. 2 is a schematic block diagram of an example resonant magnetic coupling circuit of the resonant contactless power supply equipment, in accordance with embodiments of the present invention.

Referring now to FIG. 2, shown is a schematic block diagram of an example resonant magnetic coupling circuit of the resonant contactless power supply equipment, in accordance with embodiments of the present invention. In this particular example, transmitting coil L1 can be equivalent to ideal coil $L_s$ and coil resistor $R_s$. Similarly, receiving coil L2 can be equivalent to ideal coil $L_d$ and coil resistor $R_d$, and ideal coils $L_s$ and $L_d$ may be coupled with each other. For both transmitting and receiving resonant circuits 112 and 121, series resonance circuitry can be configured with resonant resistors, resonant capacitors, and/or resonant inductors. For example, transmitting resonant capacitor $C_s$ may be included in transmitting resonant circuit 112, and receiving resonant capacitor $C_d$ may be included in receiving resonant circuit 121. As described above, transmitting and/or receiving resonant capacitors $C_s$ and $C_d$ can be independent components, or equivalent distributive components.

The resonant circuit and the magnetic coupling circuit may thus form a mutual inductance coupling circuit. To achieve energy transmission in a resonant mode from transmitting resonant circuit 112 to receiving resonant circuit 121, the frequency of transmitting and receiving resonant circuits 112 and 121 should be consistent with each other, which can be indicated as the following formula:

$$f_s = 1/2\pi \cdot \sqrt{L_s \cdot C_s} = 1/2\pi \cdot \sqrt{L_d \cdot C_d} = f_d$$

For example, $f_s$ may represent the resonant frequency of transmitting resonant circuit 112, $f_d$ may represent the resonant frequency of receiving resonant circuit 121, $L_s$ may represent the inductance of first ideal coil $L_s$, $L_d$ may represent the inductance of second ideal coil $L_d$, $C_s$ may represent the capacitance of the transmitting resonant capacitor, and $C_d$ may represent the capacitance of the receiving resonant capacitor. The inductance of ideal coils $L_s$ and $L_d$ can be substantially consistent (e.g., the same), and the capacitance of transmitting and receiving resonant capacitors $C_s$ and $C_d$ can be substantially consistent (e.g., the same) in order to guarantee that the resonant frequency of transmitting and receiving resonant circuits 112 and 121 are consistent with each other, which may be referred to as "the self-inductance resonant frequency."

When operated at the self-inductance resonant frequency, both transmitting resonant circuit 112 and receiving resonant circuit 121 can be operated in a resonant mode. Thus, the impedance of the inductors and capacitors of the resonant and magnetic coupling circuitry can be offset in order to achieve a much higher efficiency, as compared to other approaches.

Figure 3:
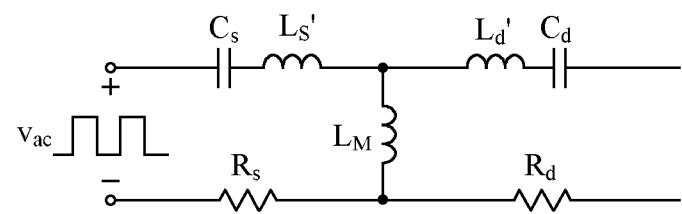
FIG. 3 is a schematic block diagram an example equivalent circuit diagram of the resonant magnetic coupling circuit of FIG. 2, in accordance with embodiments of the present invention.

Referring now to FIG. 3, shown is a schematic block diagram an example equivalent circuit diagram of the resonant magnetic coupling circuit of FIG. 2, in accordance with embodiments of the present invention. Because coupling between transmitting and receiving coils L1 and L2 can be divided into two parts, leakage inductance and self-inductance, the magnetic coupling circuit of FIG. 2 can be equivalent to the schematic diagram of FIG. 3. Therefore, coupled ideal coils $L_s$ and $L_d$ can be decoupled as transmitting leakage inductance $L_s'$, receiving leakage inductance $L_d'$, and self-inductance $L_M$. It should be noted that inductance $L_M$ may be referred to herein as "self-inductance $L_M$" or "mutual inductance $L_M$."

Figure 4:
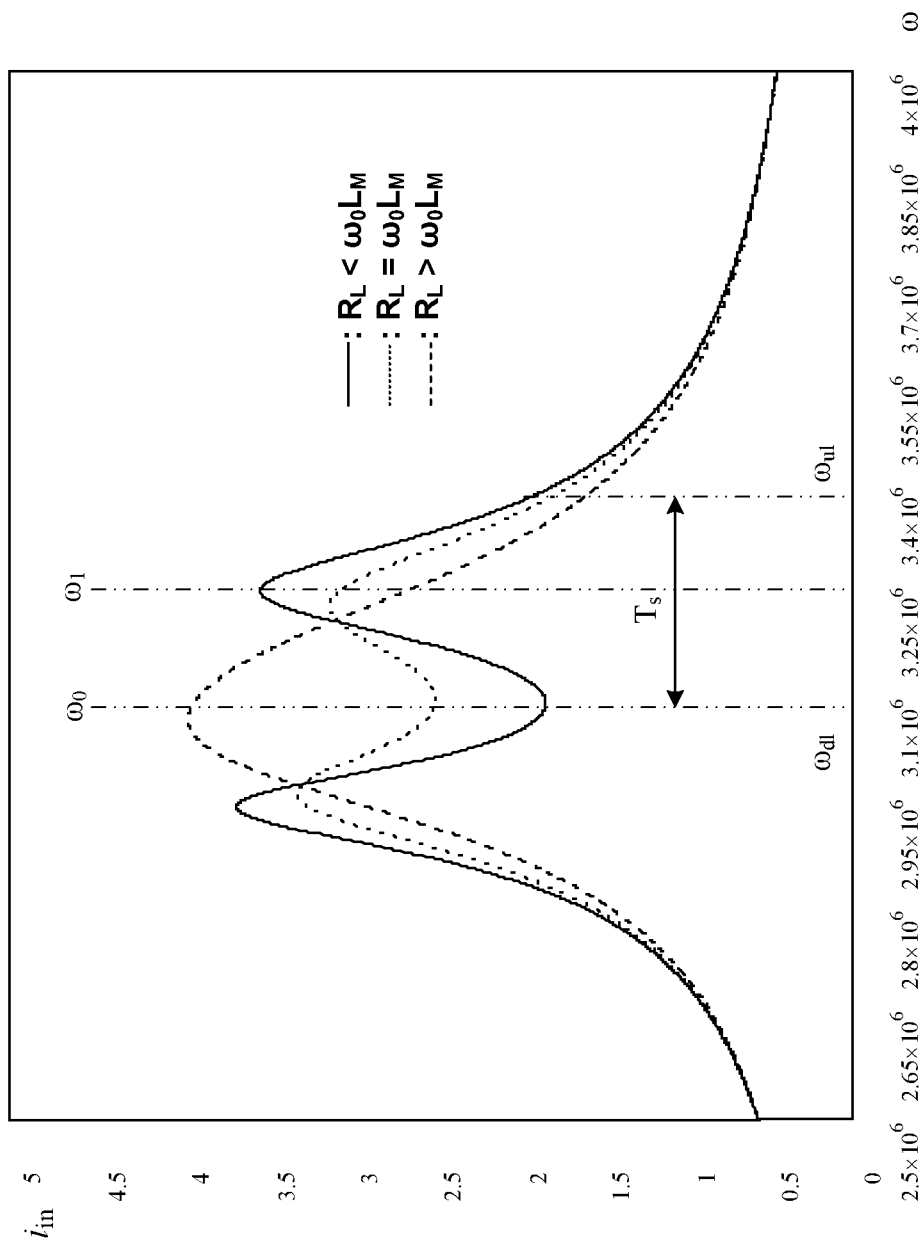
FIG. 4 is a waveform diagram of an example input current that varies along with the frequency of the resonant magnetic coupling circuit of FIG. 2, in accordance with embodiments of the present invention.

Referring now to FIG. 4, shown is a waveform diagram of an example input current that varies along with the frequency of the resonant magnetic coupling circuit of FIG. 2, in accordance with embodiments of the present invention. Based on the circuit of FIG. 2, the coupling degree may vary along with the relative position and surrounding environment to lead to the variation of transmitting leakage inductance $L_s'$, receiving leakage inductance $L_d'$, and mutual inductance $L_M$. If all other components except the load of both transmitting and receiving resonant circuits 112 and 121 are determined, with the variation of the coupling degree between load impedance $R_L$ and mutual inductance $L_M$, input current $i_{in}$ may correspondingly vary along with input voltage $V_{ac}$.

If $R_L < \omega_0 \times L_M$ (where $\omega_0$ represents the resonant angle frequency of the transmitting resonant circuit), the curve diagram of the resonant characteristics of the circuit can be indicated as a curve with two peak values. Input current $i_{in}$ may reach the peak value at leakage inductance resonant frequency $\omega_1$, and may reach the valley value at resonant frequency $\omega_0$. When a high frequency AC power with leakage inductance resonant frequency $\omega_i$ is input to the resonant and magnetic coupling circuit, the input current of the transmitting side may reach the maximum value. Also, when a high frequency AC power with self-resonant frequency $\omega_0$ is input to the resonant and magnetic coupling circuit, the input current of the transmitting side may reach the valley value. It should be noted that frequency $\omega_0$ may be referred to herein as "self-resonant frequency $\omega_0$" or "resonant frequency $\omega_0$."

For example, on the condition that $L_s'C_s = L_d'C_d$, leakage inductance resonant frequency $\omega_1$ can be indicated as: $1/2\pi \cdot \sqrt{L_s' 19 C_s}$, and $L_s'$ may represent the inductance of the leakage inductor of the transmitting side, the value of which can be indicated as $L_s - L_M$. On the condition that $R_L = \omega_0 \times L_M$, the curve diagram of the resonant characteristics of the circuit may be indicated as a curve with two peak values. Input current $i_{in}$ can reach the peak value at leakage inductance resonant frequency $\omega_1$, and may reach the valley value at resonant frequency $\omega_0$. On the condition that $R_L > \omega_0 \times L_M$, the curve diagram of the resonant characteristics of the circuit may be indicated as a curve with one peak value, and input current $i_{in}$ may reach the peak value at resonant frequency $\omega_0$.

The leakage inductance resonant frequency can be obtained by scanning in accordance with the above characteristic. In this particular example, when the impedance of the output terminals is less than the value $\omega_0 \times L_M$, the high frequency AC power of a different frequency can be generated consequently by inversion circuit 111a. The frequency at which the amplitude of input current $i_{in}$ is highest can be configured as leakage inductance resonant frequency $\omega_1$ by detecting the amplitude of input current $i_{in}$ at such different frequencies.

For example, the scanned frequencies can be between upper limit scanning frequency $\omega_{u1}$ and lower limit scanning frequency $\omega_{d1}$. The frequency control signal may be generated by control circuit 111b from high to low frequencies can be utilized to determine leakage inductance resonant frequency $\omega_1$. As those skilled in the art will recognize, the frequency control signal can also be generated by control circuit 111b from low to high frequencies, or in any other suitable order, to determine leakage inductance resonant frequency $\omega_1$.

The scanned frequencies can be a plurality of frequencies with a determined step length between upper limit scanning frequency $\omega_{u1}$ and lower limit scanning frequency $\omega_{d1}$. The scanning accuracy of leakage inductance resonant frequency $\omega_1$ can be regulated by regulating the determined step length. All frequencies of the full frequency range can be scanned in order to obtain the leakage inductance resonant frequency. Further, the scanning can also occur in sequence, and may be stopped when input current $i_{in}$ reaches the peak value.

As shown in the example waveforms of FIG. 4, because leakage inductance resonant frequency $\omega_1$ is always higher than self-inductance resonant frequency $\omega_0$, self-inductance resonant frequency $\omega_0$ of the transmitting resonant circuit can be configured as the lower limit scanning frequency. As shown in FIG. 1, regulation circuit 122 may be coupled in parallel with the output terminal of the power supply equipment, in order to guarantee that the impedance of the output terminals is less than a predetermined impedance. For example, the predetermined impedance may have a value that is at least as high as $\omega_0 \times L_M$. Therefore, at the frequency scanning time period, input current $i_{in}$ may reach the maximum value when the frequency of the high frequency AC power is consistent with (e.g., the same as) leakage inductance resonant frequency $\omega_1$ generated by high frequency power supply 111.

As shown in the example of FIG. 1, regulation circuit 122 can include regulation resistor $R_{MOD}$ and regulation switch $S_1$ coupled in series between the two output terminals of the power supply equipment/circuit. Regulation switch $S_1$ can be turned on during the frequency sweeping time period, and turned off after the end of the frequency sweeping time period. The impedance of regulation resistor $R_{MOD}$ can be determined or set in order to maintain the impedance of the output terminals to be less than the value of $\omega_0 \times L_M$, regardless of the variation of self-inductance $L_M$.

After an initial operation, such as after the coupling between electric energy transmitter 11 and electric energy receiver 12, during the frequency sweeping time period, a DC voltage supply can be received by inversion circuit 111a, and may be inverted into the high frequency AC power signal. Also, input current $i_{in}$ can be transferred to transmitting resonant circuit 112. For example, inversion circuit 111a can be a full bridge inversion circuit, a half bridge inversion circuit, or any other suitable type of inversion circuit. Current detection circuit 111c can detect the amplitude of input current $i_{in}$ generated by inversion circuit 111a, and the detection result may be transferred or otherwise provided to control circuit 111b.

Control circuit 111b can generate a frequency control signal of different (e.g., a plurality of) frequencies. During the frequency sweeping time period, the frequency control signal can be generated in a sequence in accordance with a plurality of frequencies with a predetermined step length between the upper scanning frequency and the lower scanning frequency. The plurality of frequencies can be the values from high to low, from low to high, or in any other suitable order. The lower scanning frequency can be self-inductance resonant frequency $\omega_0$, which may be obtained in advance by calculating in accordance with the component parameters of transmitting resonant circuit 112 and arranged in control circuit 111b.

Inversion circuit 111a can be controlled by control circuit 111b in order to generate high frequency AC power of different frequencies. The amplitude of input current $i_{in}$ can be detected by current detection circuit 111c at each of the plurality of frequencies. The frequency at which the amplitude of input current $i_{in}$ is highest may be configured as leakage inductance resonant frequency $\omega_1$. The frequency control signal corresponding to leakage inductance resonant frequency $w_1$ can be generated after the end of the frequency sweeping time period. Frequency sweeping time period $T_s$ can be a predetermined time period or duration after detection of the coupling between the transmitting and receiving coils.

Figure 5:
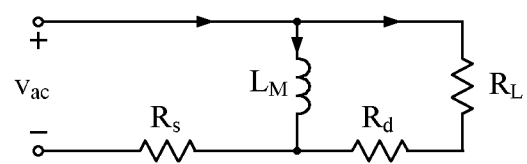
FIG. 5 is a schematic block diagram an example equivalent circuit diagram of the resonant magnetic coupling circuit of FIG. 2 operated at a leakage inductance resonant frequency, in accordance with embodiments of the present invention.

Referring now to FIG. 5, shown is a schematic block diagram an example equivalent circuit diagram of the resonant magnetic coupling circuit of FIG. 2 operated at a leakage inductance resonant frequency, in accordance with embodiments of the present invention. When operated at leakage inductance resonant frequency $w_1$, transmitting leakage inductance $L_s'$ and transmitting resonant capacitance $C_s$ of transmitting resonant circuit 112 and receiving inductance $L_d'$ and receiving resonant capacitance $C_d$ of receiving resonant circuit 121 are offset. Therefore, the circuit system can be equivalent to a two terminal network that includes self-inductance $L_M$ and coil resistors $R_s$ and $R_d$. When coil resistors $R_s$ and $R_d$ are small enough to be omitted, self-inductance $L_M$ can be seen to be coupled in parallel with the output terminals. Therefore, an output voltage consistent with input voltage $V_{in}$ can be generated by the resonant and magnetic coupling circuit, that is: $V_{R_L} \approx V_{in}$.

When the impedance of the output terminals is different, the resonant and magnetic coupling circuit can be presented as different resonant characteristics. When the coupling relationship between transmitting and receiving coils L1 and L2 remains constant (self-inductance $L_M$ is constant), and if operated at leakage inductance resonant frequency $\omega_1$, transmitting leakage inductance $L_s'$ and transmitting resonant capacitance $C_s$ of transmitting resonant circuit 112 and receiving inductance $L_d'$ and receiving resonant capacitance $C_d$ of receiving resonant circuit 121 can be offset. Therefore, after the end of frequency sweeping time period $T_s$, the impedance of the output terminals can recover to the impedance of the load by regulation circuit 122. Also, the equivalent circuit of the resonant and magnetic coupling circuit can be as shown in FIG. 3 when the power supply equipment is operated at the leakage inductance resonant frequency. Further, the leakage inductance resonant frequency can again be determined when the coupling relationship between coils is changed. In accordance with the resonant contactless power supply equipment of certain embodiments, a stable voltage can be obtained at the output terminals, which can be directly coupled to a load in order to decrease side effects to the efficiency by detuning in order to improve the efficiency.

In one embodiment, a contactless power supply method for contactlessly transferring electric energy from a transmitting coil to a receiving coil coupled to the transmitting coil, can include: (i) in a frequency sweeping time period, maintaining an impedance of output terminals to be less than a predetermined impedance in order to guarantee that an output current of a high frequency AC power reaches a maximum value when the high frequency AC power with a leakage inductance resonant frequency is provided to the transmitting coil; (ii) in the frequency sweeping time period, providing the high frequency AC power of a plurality of frequencies to the transmitting coil in sequence, and detecting an amplitude of the output current corresponding to each of the plurality of frequencies, where a frequency at which the amplitude of the output current reaches a maximum value is configured as the leakage inductance resonant frequency; and (iii) transferring the high frequency AC power of the leakage inductance resonant frequency to the transmitting coil after the frequency sweeping time period ends.

Figure 6:
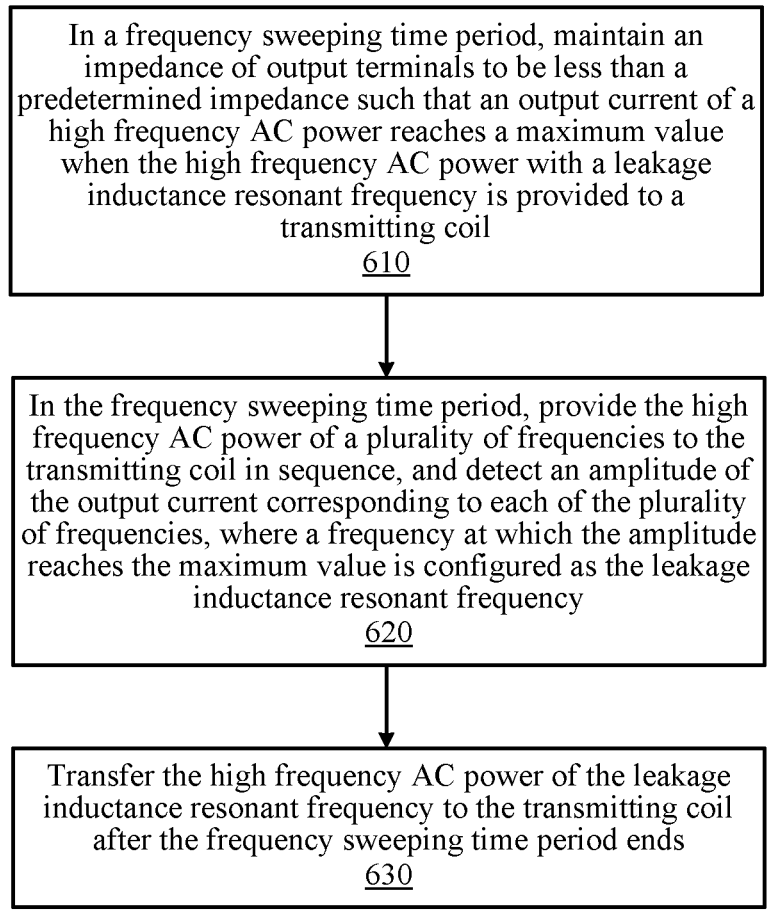
FIG. 6 is a flow diagram of an example contactless power supply method, in accordance with embodiments of the present invention.

Referring now to FIG. 6, shown is a flow diagram of an example contactless power supply method, in accordance with embodiments of the present invention. At 610, in a frequency sweeping time period, an impedance of output terminals can be maintained to be less than a predetermined impedance, in order to guarantee that an output current of a high frequency AC power reaches a maximum value when the high frequency AC power with a leakage inductance resonant frequency is provided to the transmitting coil.

At 620, in the frequency sweeping time period, the high frequency AC power of a plurality of frequencies can be provided to the transmitting coil in sequence, and the amplitude of the output current corresponding to each of the plurality of frequencies may be detected. For example, the frequency at which the amplitude of the output current reaches the maximum value can be configured as the leakage inductance resonant frequency. At 630, the high frequency AC power of the leakage inductance resonant frequency may be transferred to the transmitting coil after the end of the frequency sweeping time period. For example, the frequency sweeping time period can be a predetermined time period after detection of the coupling between the transmitting and receiving coils.

For example, the plurality of frequencies can be between an upper limit scanning frequency and a lower limit scanning frequency. Also, the step that the high frequency AC power of the plurality of frequencies is sequentially transferred to the transmitting coil can include the high frequency AC power transferred from high frequency to low frequency, from low to high frequency, or in any other suitable order. For example, the plurality of frequencies can include frequencies that are spaced by a predetermined step length sequentially between the upper limit and lower limit scanning frequencies. Also for example, the lower limit scanning frequency can be a self-inductance resonant frequency.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus, comprising:
   a) a high frequency power supply configured to generate a high frequency AC power;
   b) a transmitting resonant circuit comprising a transmitting coil, and being configured to receive said high frequency AC power from said high frequency power supply;
   c) a receiving resonant circuit comprising a receiving coil that is contactlessly coupled to said transmitting coil, and being configured to receive electric energy from said transmitting resonant circuit;
   d) wherein in accordance with information representing that an output current of said high frequency power supply at different frequencies during a frequency sweeping time period reaches a maximum value, a leakage inductance resonant frequency is obtained; and
   e) a regulation circuit having a regulation resistor and a regulation switch coupled in series, wherein said regulation switch is controlled to be on during said frequency sweeping time period, and wherein a value of said regulation resistor is less than a predetermined impedance.

2. The apparatus of claim 1, wherein said high frequency power supply comprises:
   a) an inversion circuit configured to generate said high frequency AC power in accordance with a frequency control signal, wherein a frequency of said high frequency AC power corresponds to a frequency of said frequency control signal;
   b) a current detection circuit configured to detect an amplitude of said output current that is generated by said inversion circuit; and
   c) a control circuit configured to generate said frequency control signal to control said inversion circuit to generate said high frequency AC power of a plurality of frequencies in sequence during said frequency sweeping time period, and to detect said amplitude of said output current corresponding to each of said frequencies, wherein a frequency at which said amplitude of said output current is highest is configured as said leakage inductance resonant frequency, and wherein said frequency control signal with a frequency consistent with said leakage inductance resonant frequency is activated after the end of said frequency sweeping time period.

3. The apparatus of claim 2, wherein said frequency sweeping time period comprises a predetermined time period after detection of coupling between said transmitting coil and said receiving coil.

4. The apparatus of claim 1, wherein said predetermined impedance is not higher than a product of a self-resonant frequency and a mutual inductance of said transmitting and receiving coils.

5. The apparatus of claim 2, wherein said plurality of frequencies are between an upper limit scanning frequency and a lower limit scanning frequency, and said control circuit is configured to generate said frequency control signal in a sequence from high frequency to low frequency, or in a sequence from low frequency to high frequency, in order to determine said leakage inductance resonant frequency.

6. The apparatus of claim 5, wherein said plurality of frequencies are spaced by a predetermined step length sequentially between said upper limit scanning frequency and said lower limit scanning frequency.

7. The apparatus of claim 5, wherein said lower limit scanning frequency comprises said self-resonant frequency.

8. A resonant contactless electric energy transmitter configured to contactlessly supply electric energy to an electric energy receiver having a regulation resistor and a regulation switch coupled in series, wherein said regulation switch is controlled to be on during a frequency sweeping time period, and wherein a value of said regulation resistor is less than a predetermined impedance, the resonant contactless electric energy transmitter comprising:
   a) a high frequency power supply configured to generate a high frequency AC power with a frequency that is the same as a leakage inductance resonant frequency, wherein said leakage inductance resonant frequency is obtained by detection of an output current of said high frequency power supply that corresponds to said high frequency AC power of a sequence of different frequencies during said frequency sweeping time period;
b) a transmitting resonant circuit comprising a transmitting coil, and being configured to receive said high frequency AC power from said high frequency power supply; and
c) wherein said leakage inductance resonant frequency is changed when a coupling relationship between said transmitting coil and said receiving coil is changed.

9. The resonant contactless electric energy transmitter of claim 8, wherein said high frequency power supply comprises:
a) an inversion circuit configured to generate said high frequency AC power in accordance with a frequency control signal, wherein a frequency of said high frequency AC power corresponds to a frequency of said frequency control signal;
b) a current detection circuit configured to detect an amplitude of said output current generated by said inversion circuit; and
c) a control circuit configured to generate said frequency control signal to control said inversion circuit to generate said high frequency AC power of a plurality of frequencies in sequence during said frequency sweeping time period, and to detect said amplitude of said output current corresponding to each of said frequencies, wherein said frequency at which said amplitude of said output current is highest is configured as said leakage inductance resonant frequency, and wherein said frequency control signal with a frequency consistent with said leakage inductance resonant frequency is output after the end of said frequency sweeping time period.

10. A contactless power supply method for contactlessly transferring electric energy from a transmitting coil to a receiving coil coupled to said transmitting coil, the method comprising:
a) in a frequency sweeping time period, controlling a high frequency power supply to generate a high frequency AC power of a plurality of frequencies transferred in sequence to said transmitting coil;
b) obtaining a leakage inductance resonance frequency only in accordance with information representing that an output current of said high frequency power supply at different frequencies during said frequency sweeping time period reaches a maximum value; and
c) after said frequency sweeping time period, controlling said high frequency power supply to generate said AC power with a frequency that is consistent with the same as said leakage inductance resonant frequency that is transferred to said transmitting coil; and
d) controlling a regulation switch that is coupled in series with a regulation resistor to be on during said frequency sweeping time period, wherein a value of said regulation resistor is less than a predetermined impedance.

11. The method of claim 10, wherein:
a) said frequency sweeping time period comprises a predetermined time period after detecting a coupling between said transmitting coil and said receiving coil;
b) said plurality of frequencies are between an upper limit scanning frequency and a lower limit scanning frequency; and
c) said high frequency AC power is sequentially transferred to said transmitting coil comprises at steps from high to low frequencies, or from low to high frequencies.

12. The method of claim 11, wherein said plurality of frequencies comprises frequencies that are sequentially spaced by a predetermined step length between said upper limit scanning frequency and said lower limit scanning frequency.

13. The method of claim 11, wherein said lower limit scanning frequency comprises said self-resonant frequency.

14. The apparatus of claim 1, wherein during said frequency sweeping time period, an impedance of output terminals of said apparatus is set to be less than said predetermined impedance.

15. The apparatus of claim 14, further comprising a regulation circuit configured to regulate said impedance of output terminals of said apparatus to be less than said predetermined impedance.

16. The apparatus of claim 15, wherein said regulation circuit is controlled to be disconnected from said apparatus after said frequency sweeping time period.

17. The apparatus of claim 1, further comprising an AC-DC converter coupled to output terminals of said receiving resonant circuit, and being driven by said apparatus.

18. The apparatus of claim 1, wherein said regulation circuit is configured to regulate said impedance of said output terminals of said apparatus to be less than said predetermined impedance during said frequency sweeping time period, and said leakage inductance resonant frequency is obtained during said frequency sweeping time period when said output current is highest.

19. The method of claim 10, further comprising:
a) determining whether an impedance of output terminals is higher than said predetermined impedance before said frequency sweeping time period; and
b) in response to said impedance being determined as higher than said predetermined impedance, regulating said impedance to be less than said predetermined impedance.

20. The apparatus of claim 1, wherein:
a) said high frequency power supply is configured to generate said high frequency AC power at said leakage inductance resonant frequency; and
b) said leakage inductance resonant frequency is changed when a coupling relationship between said transmitting coil and said receiving coil is changed.

* * * * *